RECIPROCATING STYLUS RECORDER

Filed Nov. 19, 1968

INVENTOR
LELAND TSCHURR
Jerry W. Mills
ATTORNEY

United States Patent Office 3,541,578
Patented Nov. 17, 1970

3,541,578
RECIPROCATING STYLUS RECORDER

Leland Tschurr, Dallas, Tex., assignor to Texas Instruments Incorporated, Dallas, Tex., a corporation of Delaware Filed Nov. 19, 1968, Ser. No. 776,883
Int. Cl. G01d *9/26;* G01v *1/24*
U.S. Cl. 346—139 16 Claims

ABSTRACT OF THE DISCLOSURE

Data is plotted on a record medium by maintaining the record medium stationary while a recording stylus plots a series of linear segments representative of the data across the record medium in a first direction along a linear path. The plotting sweep of the stylus is initiated by a start pulse which causes the generation of a ramp function. A servo motor responsive to the ramp function controls the movement of the stylus. After the completion of a plotting sweep of the stylus across the record medium, the record medium is translated in a direction perpendicular to the linear path for a preselected increment while the recording stylus is moved in a second direction along the linear path in order to position the recording stylus for the plotting of the next series of linear segments.

This invention relates to the recording of information, and more particularly to the automatic recordation of seismic signals in a seismic exploration system.

It is common practice in the seismic exploration of marine areas to move a vessel along a preselected water course while streaming a long cable containing seismic detectors. A seismic-impulse generator is periodically actuated aboard the vessel, with the reflections of the seismic impulses being received by the seismic detectors which generate electrical signals in response thereto. The electrical signals generated in response to successive seismic impulses are suitably processed and then recorded in side-by-side relationships to provide a graph, or profile, of the reflecting subsurface interfaces.

Recording systems heretofore developed for plotting seismic signals obtained from a marine seismic exploration system in a side-by-side relationship have generally utilized a rotating drum or belt recording member which must be rotated in synchronism with the generating of the seismic impulses. A recording system utilizing a helical recording member is disclosed in U.S. Pat. 3,219,968, entitled "Method and System for Recording Repetitive Seismic Signals," issued to G. B. Loper et al. on Nov. 23, 1965.

These previously developed recording systems have thus generally required a clock synchronizing signal, and problems have often arisen by the recording system moving out of synchronism with the clock signal. Moreover, such previously developed recording systems have usually provided a plotting sweep in only one direction, therefore presenting recording difficulties when the marine vessel changed directions while recording seismic data. It has also not been generally possible in many previous recording systems to easily and accurately adjust the sweep time or time base of the seismic profile.

In accordance with the present invention, electrical signals bearing seismic information are utilized to modulate the output of a recording stylus which is moved across a record medium along a linear path. The recording stylus plots a series of linear segments representing the seismic information across the record medium along the linear path. After a traverse of the record medium by the stylus, the record medium is moved normal to the linear path for a preselected increment while the recording stylus is returned along the linear path to a position for plotting of the next series of linear segments across the record medium.

In a more specific aspect of the invention, a start pulse initiates the generation of a ramp function which controls the rate of movement of the recording stylus across the record medium. Sensing structure senses when the recording stylus has moved across the record medium, and generates signals which return the recording stylus to its reference position and increment the recording medium for the plotting of the next seismic exploration cycle. The initiation of the recording cycle of the present profiler is independently controllable. Structure is provided to allow selective changes in the sweep direction of the recording stylus, and to vary the rate of the traverse of the stylus across the record medium to provide selective time scales.

For a more complete understanding of the present invention and for further objects and advantages thereof, reference is now made to the following description taken in conjunction with the accompanying drawings, in which.

PROFILER DISPLAY SYSTEM

Figure 1:
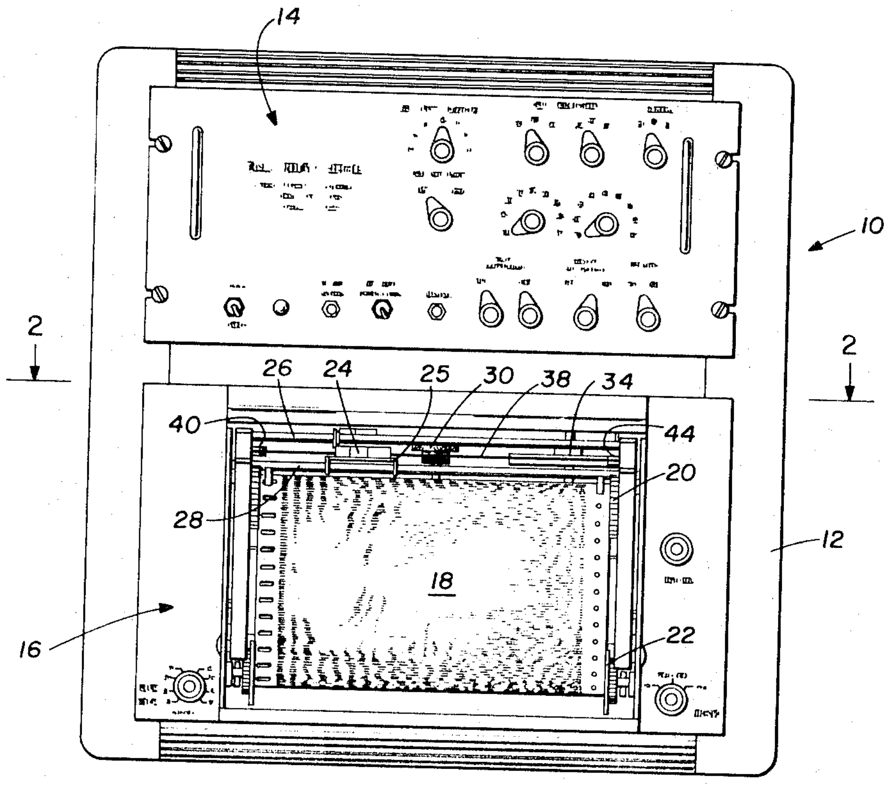
FIG. 1 illustrates a front view of the present seismic profiling display.
Figure 2:
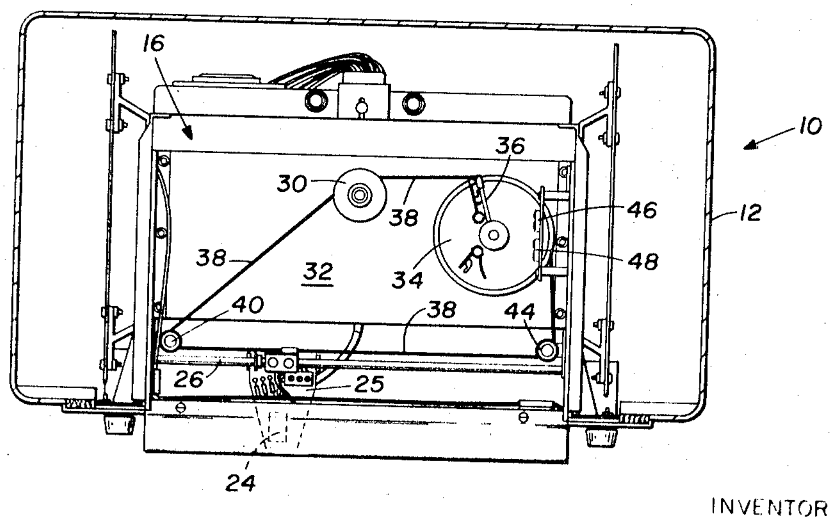
FIG. 2 is a sectional view of the system shown in FIG. 1 taken generally along the section lines 2—2.

FIGS. 1 and 2 illustrate the display system of the present seismic profiler which is designated generally by the numeral 10. The profiler 10 comprises a main housing 12 which encloses a control unit 14 and a display unit 16. The display unit includes a record medium which comprises a strip of chart paper 18. The upper portion of the chart paper 18 is rolled about a roller 20, while the lower portion of the chart paper 18 is received by a roller 22. Roller 22 is rotated in preselected increments by a suitable motor (not shown).

In the preferred embodiment, the chart paper 18 comprises conductive type paper such as the paper sold under the trade name Timemark 14 by Communications Paper, Inc. of Scranton, Pa., or capacitive coupling-type paper such as the paper sold under the trade name Timefax NDA by Communications Paper Inc. When the capacitive-coupling type of recording chart paper is utilized, the writing surface of the paper is required to be grounded. A pair of spring-loaded wheels (not shown) are thus provided with the chart carriage to ride over the chart paper, with the wheels being grounded to the chassis.

A recording stylus 24 is carried by a carriage 25 which is slidably mounted on a pair of parallel bars 26 and 28 for reciprocation along a linear path across the chart paper 18. The stylus 24 is of the electrostatic type wherein a varying voltage is applied from the stylus 24 to the chart paper 18 to burn the surface of the paper. The density of the record provided by the stylus 24 depends upon the stylus sweep rate, the magnitude of the signal applied to the stylus, and the like.

The output shaft 30 of a servomotor rotatably extends above a support panel 32. A potentiometer pulley 34 rotatably extends above the support panel 32 and includes a rigidly attached actuator arm 36. A length of wire or cable 38 is fixedly attached at two ends to the potentiometer pulley 34 and is wrapped several times around the servomotor output shaft 30 to insure frictional contact therewith. The cable 38 then extends about a pulley 40 to the carriage 25, wherein it is fixedly attached. Cable 38 then extends from the carriage 25 about a pulley 44 to the potentiometer pulley 34. Rotation of the output shaft 30 thus rotates the poentiometer pulley 34, as well as translating the recording stylus 24 along the bars 26 and 28. The servomotor rotating output shaft 30 is reversible to enable the stylus 24 to be reciprocated along bars 26 and 28.

A pair of span limit microswitches 46 and 48 are rigidly mounted above the potentiometer pulley 34. The actuator arm 36 rotates with the potentiometer pulley 34 and is positioned at a level to actuate one of the microswitches 46 and 48 when the potentiometer pulley 34 reaches the desired maximum amount of rotation. Microswitches 46 and 48 thus provide indications when the recording stylus 24 has reached the end of a traverse across the chart paper 18. Two microswitches are provided so that the span limit of the stylus 24 can be sensed during a stylus scan in either direction.

The display unit 16 comprises the plotting unit manufactured and sold under the trade name servo/riter by Texas Instruments Incorporated of Houston, Tex., with the addition of an electrostatic stylus and span limit sensing of the stylus. While an electrostatic type of stylus 24 has been illustrated, it will be understood that other stylus types, such as ink pen types, could also advantageously be utilized for various applications.

The control unit 14 includes circuitry for controlling various parameters of the display unit 16, with a plurality of knobs and switches being provided for manual control of the parameters. For instance, a trimpot adjustment is provided to vary the length of paper advanced between stylus sweeps to enable the horizontal chart scale to be adjusted. Controls are provided to vary the contrast of the display unit. Controls are also provided to enable various combinations of timebreak, timing lines and seismic data plots upon the chart paper 18.

Switches are also provided on the face of the control unit 14 to determine whether the seismic signal peaks or troughs will be marked upon the record chart. Control knobs also enable variation of the time scale plotted by the system, as well as the selection of the direction of the stylus sweep. Further, a number of controls are provided to provide selection of various processing operations performed upon the seismic data, such as low-cut and high-cut filtering, buffering, and AGC. The operation of each of these controls will be described later in greater detail.

Figure 3:
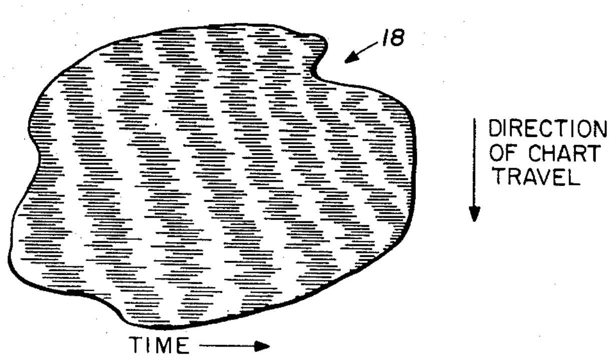
FIG. 3 is an enlarged portion of the profile chart shown in FIG. 1.

FIG. 3 illustrates an enlarged view of a portion of a seismic profile map prepared by the present system. In this profile map, the recording stylus 24 has swept from left to right, with the chart paper 18 incrementing downwardly. It will be seen that the profile map comprises a plurality of linear segments spaced along a number of parallel horizontal linear paths. In operation of the profiler system 10, the stylus 24 is initially traversed across the stationary chart paper 18 from left to right along a linear path. The output of the stylus is modulated by the input seismic signal to provide a series of linear segments having lengths proportional to the amplitude of the input seismic signal. After one complete traverse across the chart paper 18, the stylus 24 is returned in a nonrecording state from right to left while the chart paper 18 is incremented downwardly for a short distance to enable the plotting of the next horizontal line of linear segments. This plotting cycle is continuously repeated.

PROFILER CONTROL SYSTEM

Figure 4:
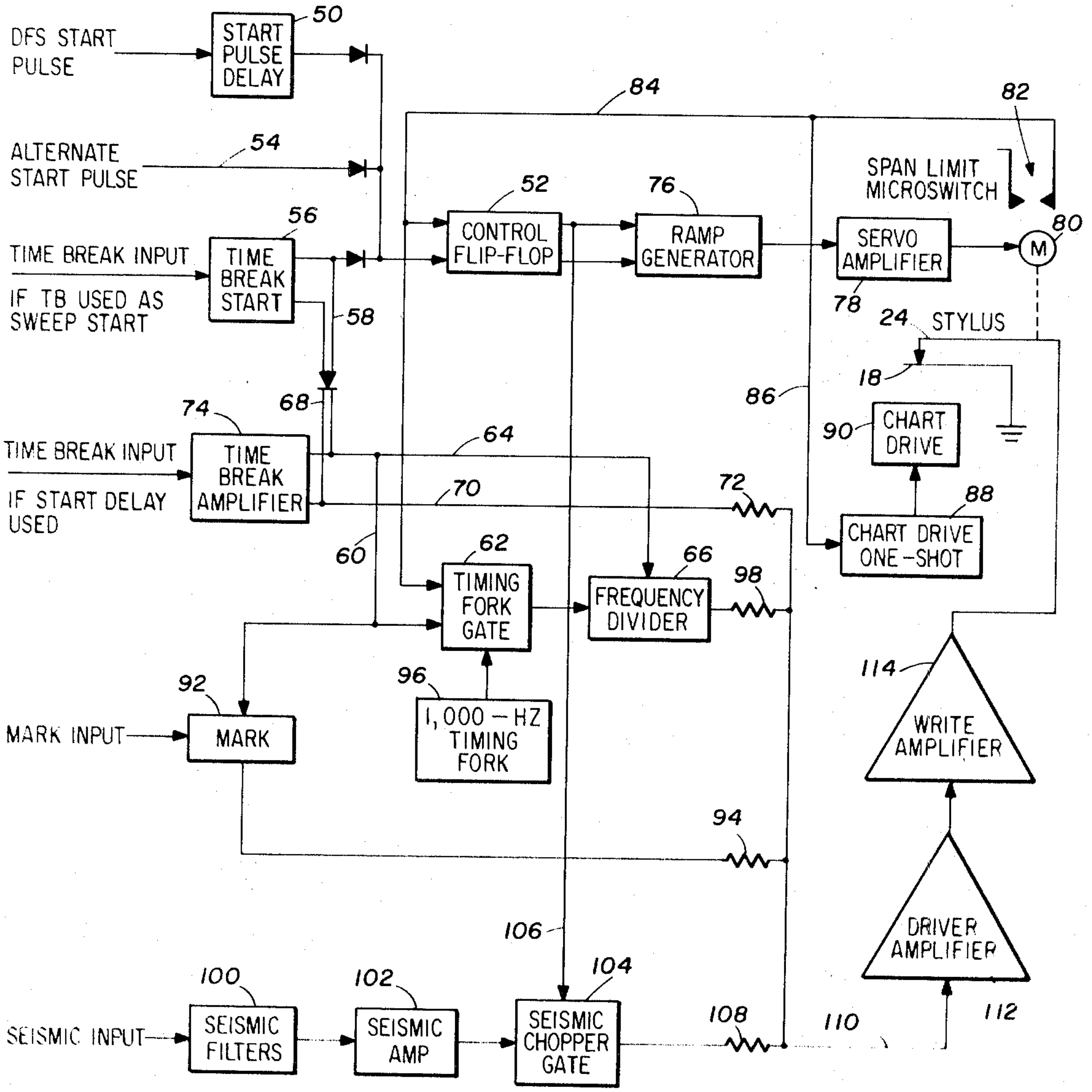
FIG. 4 is a block diagram of the profiler control system.

FIG. 4 illustrates a block diagram of the control circuitry of the present profiler system. Considerable flexibility is provided by the system for initiation of each plotting cycle. For instance, in one operation mode a start pulse from a digital field system is fed into a start pulse delay circuit 50. After a 450 millisecond delay, the delay circuit 50 provides a start pulse to a control flip-flop circuit 52. The 450 millisecond delay allows the display unit 16 of the profiler to start its sweep approximately 50 milliseconds before the timebreak from the seismic cycle is received. This allows the servomotor of the profiler to overcome its starting inertia, thereby enabling the recording stylus to be sweeping in a linear rate when the timebreak signal arrives. The start pulse delay circuit 50 is utilized only if the time intervals between the digital field system start to the timebreak remain substantially constant over a period of time and do not vary more than several milliseconds during consecutive runs.

In another operation mode, provision is made for an alternate start pulse to be applied to lead 54 for application to the control flip-flop circuit 52. Further, the timebreak of the seismic cycle may be used as a sweep start by application to a timebreak start circuit 56. The output of the timebreak start circuit 56 is applied to the control flip-flop circuit 52 and is also applied via leads 58 and 60 to the input of a timing fork gate 62. The timebreak signal is applied via lead 64 for control of a frequency divider 66. An output from the timebreak start circuit 56 is also applied via leads 68 and 70 to a summing resistor 72.

If the timebreak is not utilized as a start signal, the timebreak input is fed into a timebreak amplifier 74, the output of which is applied to leads 64 and 70. The output of the control flip-flop circuit 52 is fed to the input of a ramp generator 76 which generates a ramp function. The slope of the ramp function may be adjusted to vary the sweep rate of the stylus. The ramp function is fed to the input of a servo amplifier 78 which controls the operation of a servomotor 80. The servomotor 80 translates the stylus 24 by the cable drive previously described. One of the span limit microswitches designated generally by the numeral 82 is closed when the stylus 24 has completed its traverse across the chart paper 18 in the manner previously described to provide indications via lead 84 to the control flip-flop circuit 52 and to the timing fork gate 62.

Indications from the microswitch 82 are also fed via lead 86 to the input of a chart drive one-shot circuit 88 which controls the length of the record chart increment. The output of the chart drive one-shot circuit 88 is fed to a chart drive 90 which operates the incrementing drive mechanism for the chart paper 18 in the manner previously described.

Operation of a switch on the control panel of the profiler generates a mark input signal which is fed to a mark circuit 92. This input may be utilized to provide a navigation fix mark on the chart paper 18 when desired. The output of the mark circuit 92 is fed to a summing resistor 94. A timing fork 96 provides timing signals to the system via timing fork gate 62. The output of the frequency divider 66 is fed to a summing resistor 98.

The seismic input is fed through seismic filters 100 and a seismic amplifier 102. The output of the amplifier 102 is fed to a seismic chopper gate 104 which is controlled by the control flip-flip circuit 52 by signals applied via a lead 106. The output of the seismic chopper gate 104 is fed to a summing resistor 108. The signals resulting from the summation of the signals across resistor 72, 94, 98 and 108 are applied through a lead 110 to a driver amplifier 112. The output of the driver amplifier 112 is fed to a write amplifier 114 which controls the magnitude of the signal applied to the stylus 24.

In operation of the system when a digital field system start pulse is utilized, the start pulse delay circuit 50 provides a start pulse to the control flip-flop circuit 52. In response, the control flip-flop circuit 52 generates an output to trigger the generation of a ramp function from the ramp generator 76. The ramp function is compared against a reference voltage by a self-balancing potentiometer circuit within the servo amplifier 78. The differences between the two voltages is amplified and applied to the servomotor 80 which drives the stylus 24 and also drives the potentiometer in a direction that will null any difference in the voltages. For additional information in the operation of the servo amplifier 78 and servomotor 80, reference is made to the previously identified recorder manufactured and sold under the trade name servo/riter by Texas Instruments Incorporated of Houston, Tex.

The servomotor 80 thus begins operation a few milliseconds before the reception of a timebreak input at the timebreak amplifier 74. The output of the timebreak amplifier 74 provides a signal via lead 60 to operate the timing fork gate 62. Additionally, a signal is provided from the timebreak amplifier 74 via lead 64 to reset the frequency divider 66 to zero. An indication of the timebreak is provided from the timebreak amplifier 74 via lead 70 to the summing resistor 72. Additionally, an indication of the timebreak is fed via lead 60 to the input of the mark circuit 92. The timebreak signal is fed through the summing resistor 72 to the input of the driver amplifier 112. The write amplifier 114 is driven by amplifier 112 to provide an indication of the timebreak by a mark from the stylus 24 upon the record medium.

If the timebreak input is utilized as a start signal through the timebreak start 56, the operation of the system is similar, with the exception that the servomotor 80 is not started until the reception of the timebreak start signal.

A this point in the operation of the recorder, the stylus 24 is being moved across the stationary chart paper 118 at a constant speed by the servomotor 80. The seismic signal input is received from an appropriate source, such as a digital field system or a suitable central playback unit. The seismic signal is suitably filtered by seismic filters 100. The seismic filters 100 may be selectively varied between high-cut and low-cut settings to provide flexibility in processing of seismic signals under various operating conditions. The processed signals are fed through the seismic amplifier 102 for amplification. Amplifier 102 acts in the manner of a buffer amplifier, as it tends to smooth out the rapid changes in gain level that are often found in data recorded with programmed gain control or automatic gain control. A number of controls are provided for the seismic amplifier 102 in order to eliminate AGC, to provide slow or medium AGC.

The output of the seismic amplifier 102 is fed into the seismic chopper gate 104. Gate 104 gates and chops the seismic signal in order to allow the plotting of the seismic signal as a series of linear segments by the recording stylus 24. The length of the linear segments will vary with the amplitude of the seismic signal. The seismic chopper gate 104 is actuated from an output by the control flip-flop circuit 52 via lead 106. The resulting chopped seismic output is fed to the summing resistor 108 and to the input of the driver amplifier 112. The write amplifier 114 then modulates the output of the stylus 24 to plot the seismic input as a series of linear segments along a linear path.

Timing signals are provided to the stystem by the timing fork 96. The timing fork gate 62 gates the timing fork signal into the frequency divider 66 to provide 100 millisecond interval timing pulses to the summing resistor 98. These signals are added to the chopped seismic signals and fed to the driver amplifier 112 and write amplifier 114 in order to provide a series of timing marks upon the chart paper 18. Upon the reception of a mark input by the mark circuit 92, a signal is provided to summing resistor

94 and added to the chopped seismic input to provide a navigation fix mark upon the chart paper 18.

When the stylus 24 has completed a traverse across the chart paper 18, the span limit microswitch 82 is closed to reset the control flip-flop circuit 52. This reset causes the seismic chopper gate 104 to be turned off and sets the ramp generator 76 to zero. Additionally, the closing of the microswitch 82 closes the timing fork gate 62.

The closing of the microswitch 82 also provides an indication via lead 86 to the chart drive one-shot circuit 88. In response, the one-shot circuit 88 generates a single rectangular pulse of a predetermined length to the chart drive 90. The chart drive 90 then advances the chart paper 18 for an increment dependent upon the length of the rectangular pulse, The resetting of the control flip-flop circuit 52 by microswitch 82 causes the ramp function generated by the ramp generator 76 to return to zero. Circuitry within the servo amplifier 78 thus compares the zero signal to the reference voltage and drives the servomotor 80 back to the zero start position, thereby returning the stylus 24 across the record medium. Due to the fact that the timing fork gate 62 and the seismic chopper gate 104 are cut off, the stylus 24 is in a nonrecording state when moved back across the record medium. Due to the incremental movement of the chart paper 18 perpendicularly to the linear path of the stylus 24, the profiler is now in position to receive the next start pulse to initiate another plotting cycle in the manner previously described.

TIMEBREAK START AND TIMEBREAK AMPLIFIER

Figure 5:
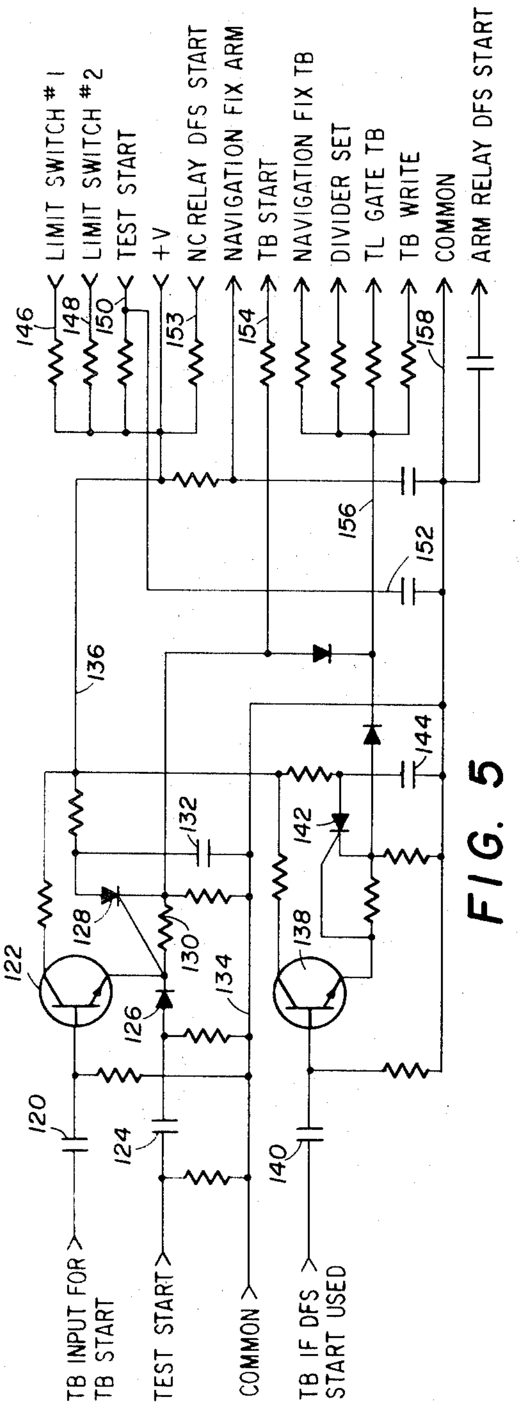
FIG. 5 is a schematic diagram of the timebreak start and amplifier circuitry.

FIG. 5 illustrates the circuitry of the timebreak start 56 and the timebreak amplifier 74. The timebreak input for use as a timebreak start is fed through a capacitor 120 to the base of a transistor 122. A test start signal utilized for testing the operation of the profiling system is fed through a capacitor 124 and diode 126 to the emitter of transistor 122. The gate electrode of a SCR 128 is directly connected to the emitter of the transistor 122, while the cathode of the SCR 128 is connected through the resistance 130 to the emitter of the transistor 122. A capacitor 132 is connected across the SCR 128 to the common lead 134.

A bias voltage is applied via lead 136 to the transistor 122 and also to the collector of a second transistor 138. When a digital field system start is utilized, the timebreak is fed through a capacitor 140 to the base of transistor 138. The gate electrode of an SCR is directly connected to the emitter of transistor 138, with the anode of the SCR 142 being connected through suitable resistances to the collector of transistor 138 and to the bias voltage applied to lead 136. A capacitor 144 is connected across the SCR 142. The outputs from microswitches 46 and 48 are applied via leads 146 and 148 to the timebreak amplifier.

Test start indications are applied to lead 150 which is connected to one plate of a capacitor 152. Indications are applied from the digital field system relay via lead 153 when the timebreak is not utilized as a start signal. The output of the timebreak amplifier is applied via lead 154. Outputs are also provided via lead 156 to the mark circuit 92, the frequency divider 66, the timing fork gate 62 and the write circuits. Lead 154 is connected to lead 156 through a diode, while lead 158 is common.

In operation, when the timebreak signal is being used as a start pulse, the timebreak signals are applied through the input capacitor 120 to turn transistor 122 on. Transistor 122 turns SCR 128 on, thereby discharging the voltage stored on capacitor 132 to provide an output via lead 154 for triggering the control flipflop circuit 52. The output is also fed out via lead 156.

Alternatively, when the digital field system signal is used as a start signal, the timebreak signal is fed via capacitor 140 to the base of transistor 138. This turns transistor 138 on, thereby turning the SCR 142 on to provide an output signal via lead 156 due to the discharge of capacitor 144. No signal is provided via lead 154 in this mode of operation of the circuit.

START PULSE DELAY AND CONTROL FLIP-FLOP

Figure 6:
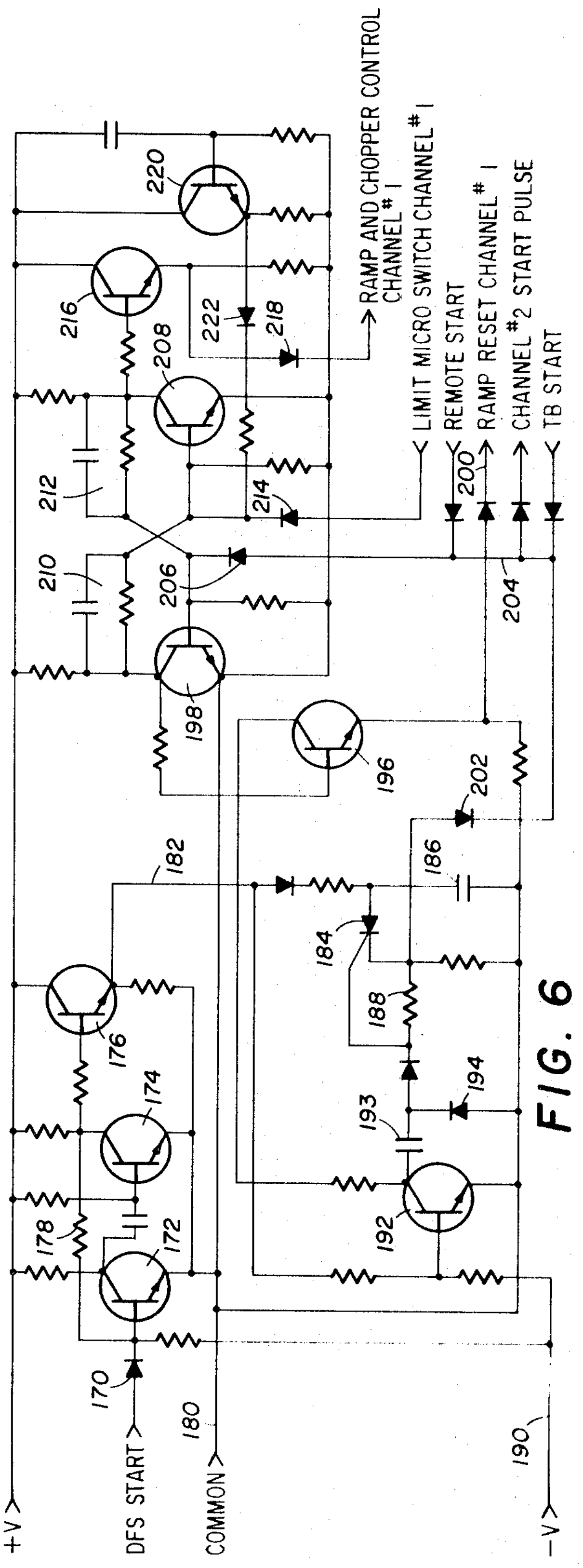
FIG. 6 is a schematic diagram of the start pulse delay and control flip-flop.

Referring to FIG. 6, a digital field system start pulse is fed through a diode 170 to the base of a transistor 172. The collector of transistor 172 is connected to the base of a transistor 174. The collector of transistor 174 is connected to the base of a transistor 176. The collector of transistor 174 is connected via resistance 178 to the base of transistor 172. The emitters of the transistors 172, 174 and 176 are connected to lead 180.

The emitter of transistor 176 is connected via lead 182 to the anode of an SCR 184 and to one terminal of a capacitor 186. A resistor 188 is connected between the gate electrode and the cathode of the SCR 184. A negative bias voltage is applied via lead 190 through suitable resistances to the base of transistor 172 and to the base of a transistor 192. A capacitor 193 and a diode 194 are connected across transistor 192 in series. The collector of transistor 192 is connected to the collector of a transistor 196. The base of transistor 196 is connected through a suitable resistance to the collector of a transistor 198, whose emitter is directly connected to common ground via lead 180. The emitter of transistor 196 is connected to provide an output signal via lead 200.

The cathode of the SCR 184 is fed via a diode 202 to a lead 204. The base of transistor 198 is connected through a diode 206 to lead 204. Transistor 198 is connected to a transistor 208 in a multivibrator configuration which includes R-C networks 210 and 212. The base of transistor 208 is connected via diode 214 to the microswitch operable by the movement of the stylus 24. The collector of transistor 208 is connected through a suitable resistance to the base of a transistor 216, the emitter of which is connected via a diode 218 to provide a ramp generator and chopper gate control signal. The emitter of a transistor 220 is coupled through a diode 222 to the base of transistor 208.

In operation of the circuitry shown in FIG. 6, the digital field system start signal is fed through diode 170 to the base of the transistor 172. Transistors 172 and 174 form a 450 millisecond one-shot multivibrator, with transistor 176 being the driver thereof. Upon reception of the positive pulse from the digital field system relay, the one-shot multivibrator is triggered on, with transistor 176 switching positive voltage to the base of transistor 192 via lead 182.

Transistor 192 and the SCR 184 comprise the pulse output circuit. Upon application of positive voltage to the base of transistor 192, the voltage at the collector of the transistor 192 drops to zero. At the same time, the positive output provided on lead 182 provides charging current to capacitor 186. After a 450 millisecond interval, the one-shot multivibrator comprising transistors 172 and 174 will reset, thereby switching transistor 176 off. This allows the base of transistor 192 to go negative and the collector of transistor 192 to become positive. The gate electrode of the SCR 184 will thus go positive due to the charge on capacitor 193. This resulting positive pulse will fire the SCR 184, thereby discharging capacitor 186. A positive start signal will thus be generated through the diode 202.

This positive start signal is provided to the multivibrator comprising transistors 198 and 208 to trigger an output through the follower transistor 216 and through the diode 218. The output from diode 218 initiates the generation of a ramp function from the ramp generator 76. When the stylus 24 has completed its traverse across the chart paper 18, an indication is received from the microswitch and is applied through diode 214 to trigger the multivibrator into its reset state, thereby emitting a negative pulse output from the collector of transistor 198. This negative pulse output turns transistor 196 off, thereby generating a ramp reset signal via lead 200 to return the ramp function to zero.

The transistor 220 resets the multivibrator circuit when the power is initially switched on by providing a positive output via diode 222. When the start signal from the digital field system is not utilized, the timebreak signal is applied via the lead 204 to trigger the multivibrator to initiate the generation of a ramp function. When the timebreak start signal is utilized, the delay provided by the start pulse delay circuitry is not utilized.

RAMP GENERATOR

Figure 7:
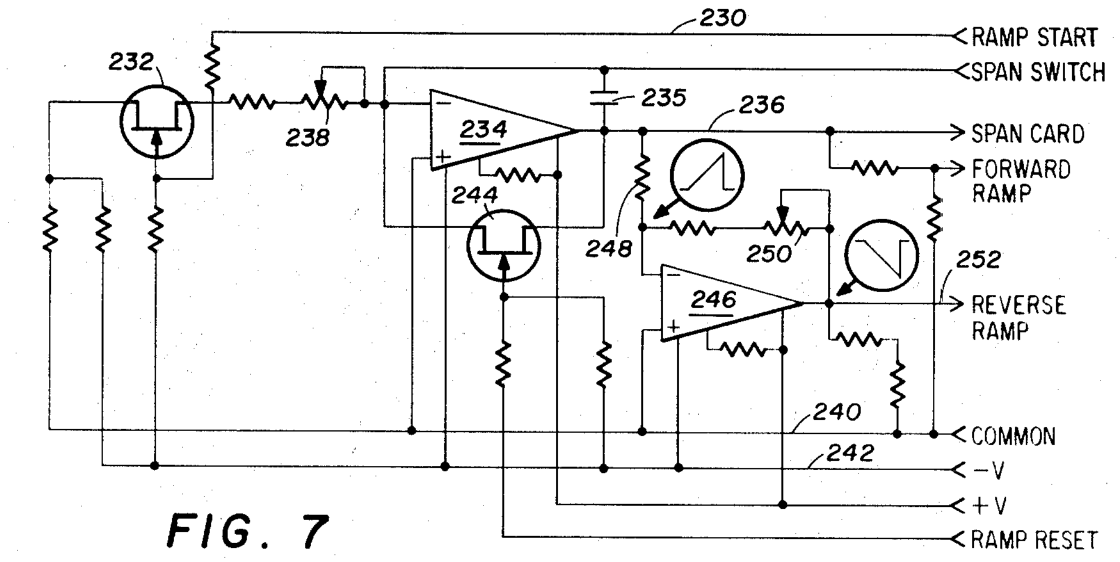
FIG. 7 is a schematic diagram of the ramp generator.

FIG. 7 illustrates circuitry for generating the ramp function for control of the servomotor 80. The start signal from the control flip-flop circuit is applied via lead 230 to a field effect transistor 232. Transistor 232 is connected via suitable resistances to the inversion input of an operational amplifier 234, the output of which is connected to a plate of a capacitor 235 and to a lead 236 to provide a positive-going ramp function. A variable resistance 238 enables selection of the rate of voltage increase of the ramp function. Bias voltage is applied to the circuitry via leads 240 and 242 and a second field effect transistor 244 is connected across the input and output of the operational amplifier 234.

A ramp reset signal is applied to the transistor 244. A second operational amplifier 246 is connected to the output of the amplifier 234 by a resistor 248. A variable resistance 250 enables selection of the rate of rise of the ramp function generated by amplifier 246. The output of the amplifier 246 is provided via lead 252 to provide a negative-going ramp function.

In operation of the ramp generator circuit shown in FIG. 7, a positive signal is provided from the control flip-flop circuit via lead 230, thereby switching transistor 232 on and transistor 244 off. Transistor 232 applies a negative voltage to the inverting input of the amplifier 234, while the turning off of transistor 244 removes the feedback shunt around the amplifier 234 and allows capacitor 235 to charge up, thereby providing a positive-going sweep signal. In a practical embodiment, the ramp function rises from zero to about 12 volts D.C. in from .5 to 6 seconds. The positive-going ramp is fed through resistor 248 to the inverting input of amplifier 246 in order to provide a negative-going ramp function via lead 252. Suitable switches are provided to route one of the ramp functions in accordance with the desired plotting direction of the stylus 24.

MARK CIRCUIT

Figure 8:
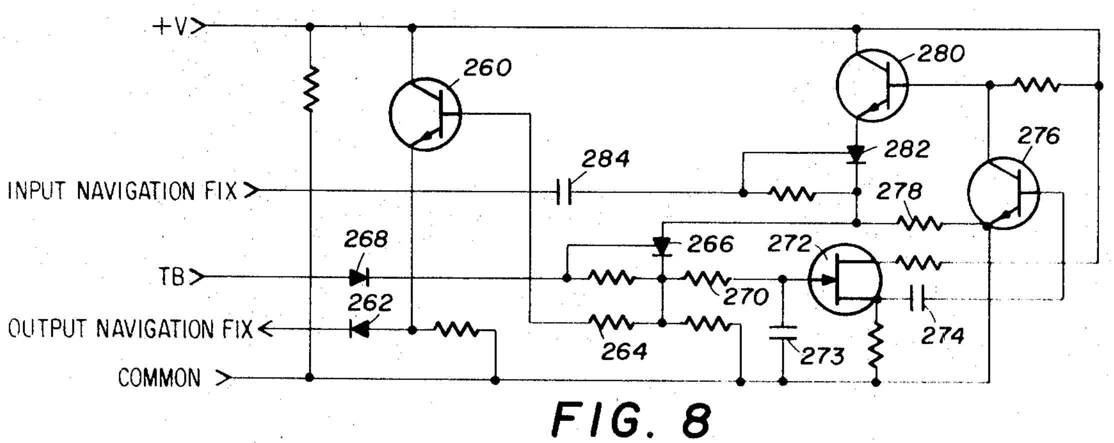
FIG. 8 is a schematic diagram of the mark circuit.

FIG. 8 illustrates the mark circuitry for emitting a 200 millisecond D.C. signal to the driver amplifier in order to plot a navigation fix mark at the start of the next sweep of the stylus 24. Positive bias voltage is applied to the collector of a transistor 260, with the emitter of transistor 260 connected through a diode 262 to provide an output navigation fix pulse of the preselected duration and magnitude. The emitter of the transistor 260 is also connected through a resistance to common ground. The base of transistor 260 is connected through a resistance 264 to common ground and also to the cathode of an SCR 266. The gate electrode of the SCR 266 is connected to the cathode of a diode 268 for reception of the timebreak signal. The cathode of the SCR is connected through a resistance 270 to a field effect transistor 272.

A capacitor 273 is connected across the transistor 272. The transistor 272 is connected through a capacitor 274 to the base of a transistor 276. The emitter of transistor 276 is connected directly to common ground and also through a resistance 278 to the anode of the SCR 266. The collector of the transistor 276 is connected to the base of the transistor 280, whose emitter is connected to the anode of an SCR 282. The cathode of the SCR 282 is connected directly to the anode of the SCR 266. The gate electrode of the SCR 282 is connected to a capacitor 284 to receive the input navigation fix signal resulting from the depression of a manual switch.

In operation of the mark circuit, the manual depression of a mark switch on a front panel of the profiler causes the SCR 282 to fire, the SCR 282 remaining on as long as there is a current source through transistor 272. At the next sweep cycle of the stylus 24, a timebreak signal is fed through diode 268 in order to fire the SCR 266, the current source being the SCR 282. A high positive voltage is thus presented at the cathode of SCR 266 and the base of transistor 260.

The mark output pulse is the voltage appearing at the emitter of the transistor 260 which is fed through the diode 262. The high positive voltage applied at the cathode of the SCR 266 provides a charging current to capacitor 273 through resistor 270. The voltage across capacitor 273 reaches the firing voltage of the unijunction transistor 272 in 200 milliseconds. The unijunction transistor 272 thus fires, providing an output pulse which switches transistor 276 on, pulling the voltage upon the base of transistor 272 to zero. This interrupts the current source of the SCR 282 and resets the SCR 282. This causes the SCR 266 to be turned off, thereby returning the voltage on the base of transistor 260 to zero, switching the marker voltage off.

TIMING FORK GATE AND CHART DRIVE ONE-SHOT

Figure 9:
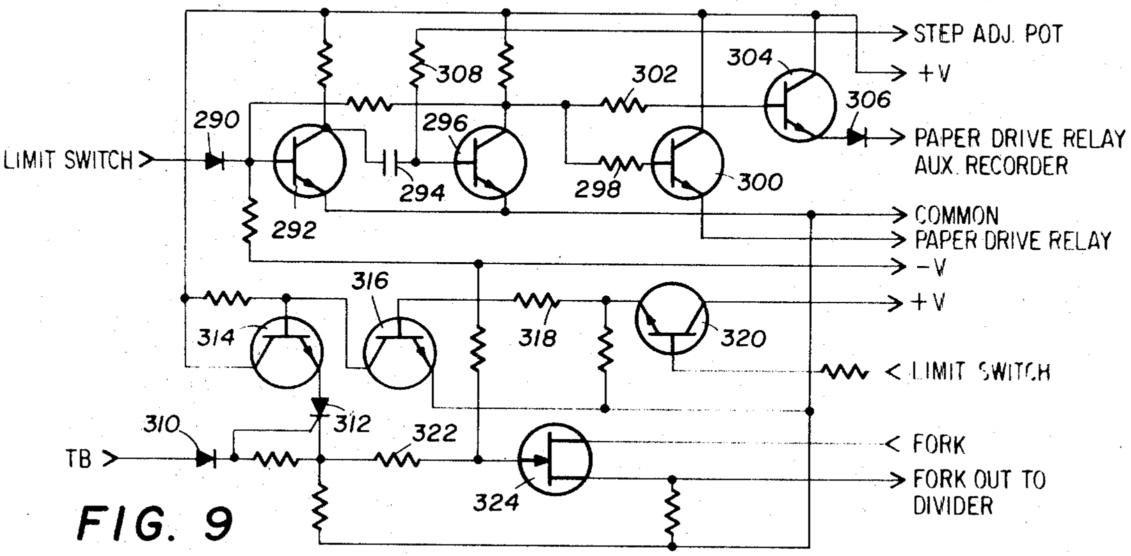
FIG. 9 is a schematic diagram of the timing fork gate and chart drive one-shot.

FIG. 9 illustrates circuitry for providing a series of output timing pulses which are provided to the frequency divider and additionally for providing incrementing pulses to the chart drive at the end of each stylus sweep. Indications from the stylus span limit microswitch are fed via diode 290 to the base of a transistor 292. The emitter of the transistor 292 is directly connected to common ground. The collector of transistor 292 is fed through a capacitor 294 to the base of a transistor 296, whose emitter is also directly connected to common ground.

The collector of the transistor 296 is connected through a resistance 298 to the base of a transistor 300, and through a resistance 302 to the base of a transistor 304. The emitter of transistor 304 is connected to a diode 306 to the paper drive relay of an auxiliary recorder when one is utilized. The emitter of transistor 300 provides an output for the paper drive relay of the present recorder. The base of transistor 296 is coupled through a resistance 308 to a suitable potentiometer which varies the length of the paper drive increment.

The timebreak signal is fed through a diode 310 to the gate electrode of an SCR 312. The anode of the SCR is connected to the emitter of a transistor 314, whose collector is directly connected to the source of bias potential. The base of transistor 312 is connected to the collector of a transistor 316, whose emitter is directly connected to common ground. The base of transistor 316 is connected through a resistance 318 to the emitter of a transistor 320. The collector of transistor 320 is directly connected to a source of bias potential and the base of transistor 320 is connected to the stylus span limit microswitch. The cathode of the SCR 312 is connected through a resistance 322 to a field effect transistor 324. The 1000 Hz. timing fork signal is connected to a base of the transistor 324, while the second base of the transistor 324 provides an output to the frequency divider circuit.

In operation of the circuitry, a positive pulse is provided by the span limit microswitch at the end of a stylus sweep cycle to the base of the transistor 292. Transistors 292 and 296 comprise a one-shot circuit which emits a single rectangular pulse of a length determined by the adjustment of the potentiometer connected via the resistor 308. The single rectangular pulse is fed through transistor 300 for operation of the paper drive relay in order to step the chart paper one increment. The signal is also fed through the transistor 304 for use in stepping the chart drive of an auxiliary profiler when utilized in parallel with the present profiler.

The operation of the timing fork gate is initiated by the timebreak signal which is fed through the diode 310 to fire the SCR 312. The field effect transistor 324 is normally biased off by a negative voltage. The firing of the SCR 312 drives this voltage positive and turns the transistor 324 on. At the end of the stylus sweep cycle, a positive pulse from the stylus limit span microswitch is applied to the base of the transistor 320, thereby switching transistor 320 and 316 on to drive the base of transistor 314 to zero. The current applied to the SCR 312 is thus reduced, allowing the SCR 312 to switch off and turn off the field effect transistor 324 to turn the gate off.

FREQUENCY DIVIDER

Figure 10:
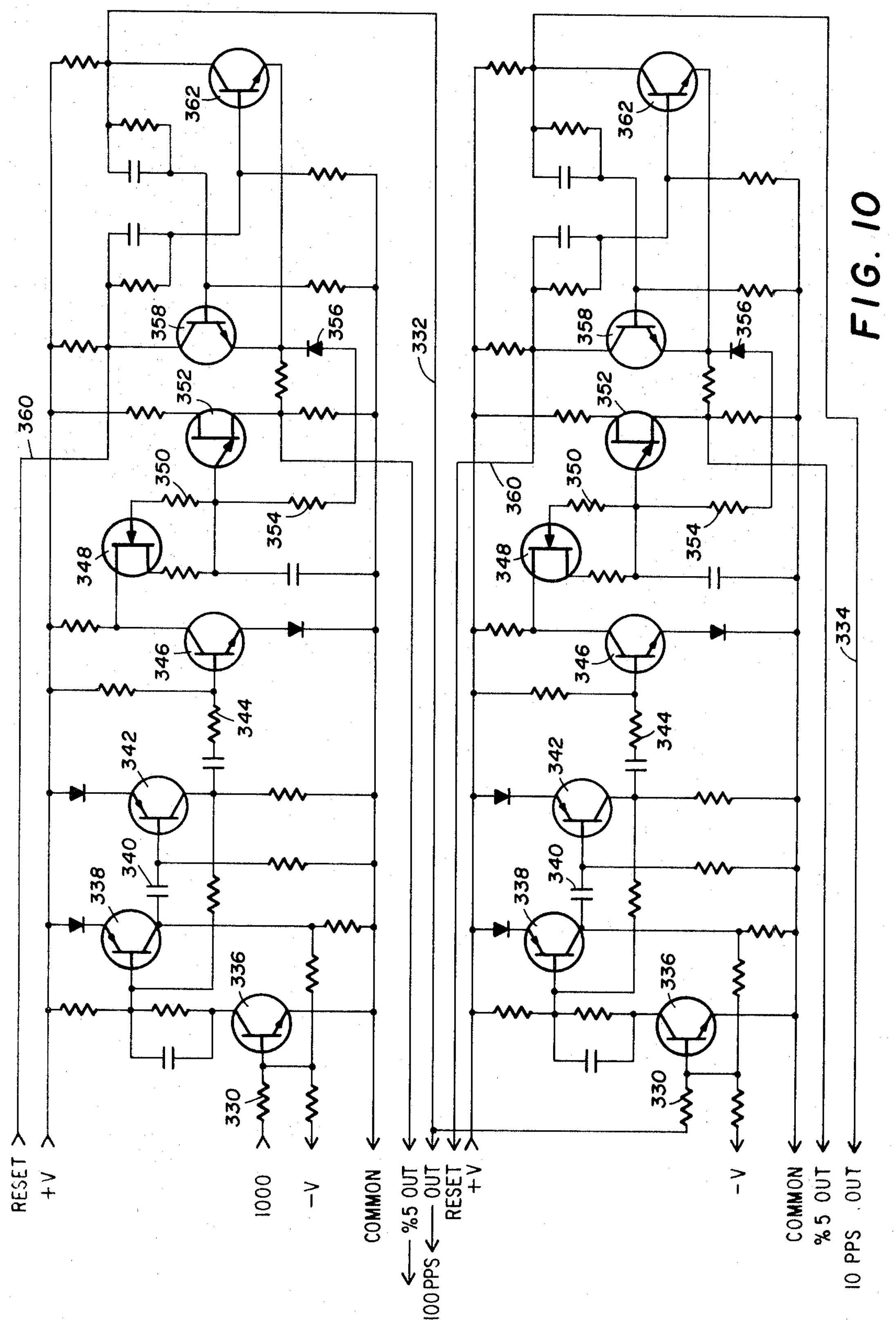
FIG. 10 is a schematic diagram of the frequency divider.

FIG. 10 illustrates the frequency divider circuit which divides a 1000 Hz. timing frequency into pulses of 100 millisecond intervals for use as a time scale on the chart paper 18. The frequency divider comprises two identical sections, and like numbers are therefore used for like and corresponding elements. The first section receives the signal from the timing fork through the resistor 330. The resulting output of 100 pulses per second which is provided via lead 332 is fed to the second stage of the frequency divider. A 10 pulse per second output is fed to the seismic chopper circuit and driver amplifier via lead 334.

Input pulse trains are fed through the resistor 330 in each of the two stages to the base of a transistor 336. The collector of the transistor 336 is fed through a resistance-capacitor network to the base of a transistor 338, the collector of which is fed via capacitor 340 to the base of a transistor 342. The collector of transistor 342 is fed through resistor 344 to the base of a transistor 346, whose collector output is fed to a field effect transistor 348. Transistor 348 is connected via resistance 350 to the unijunction transistor 352 and through resistance 354 and diode 356 to the emitter of transistor 358. A reset signal is applied to the transistor 358 via lead 360. Transistor 358 is connected to transistor 362 in a multivibrator configuration in order to provide a pulse train output via leads 332 and 334, respectively.

In operation of each of the frequency divider stages, transistors 336, 338 and 342 act as a pulse-shaping network. The output of transistor 342 drives the transistor 346 to provide an input to a stairstep unijunction divider circuit comprising transistors 348 and 352. The output of the unijunction divider circuit is fed via resistor 354 and diode 356 to the input of the multivibrator comprising transistors 358 and 362.

The output of the unijunction divider circuit comprises one stepped output pulse for each five pulses received from the pulse-shaping network. The multivibrator comprising transistors 358 and 362 requires two input pulses from the unijunction divide network for one output cycle. Thus, the input signal to each of the two stages is divided by a factor of 10. The first stage divides the 1000 Hz. pulse signals to provide a 100 pulse per second output. This pulse train is fed to the second stage via lead 332 to provide via lead 334 a 10 pulse per second output. The occurance of the timebreak pulse from the timebreak amplifier via lead 360 resets both frequency divider stages to zero.

SEISMIC AMPLIFIER

Figure 11:
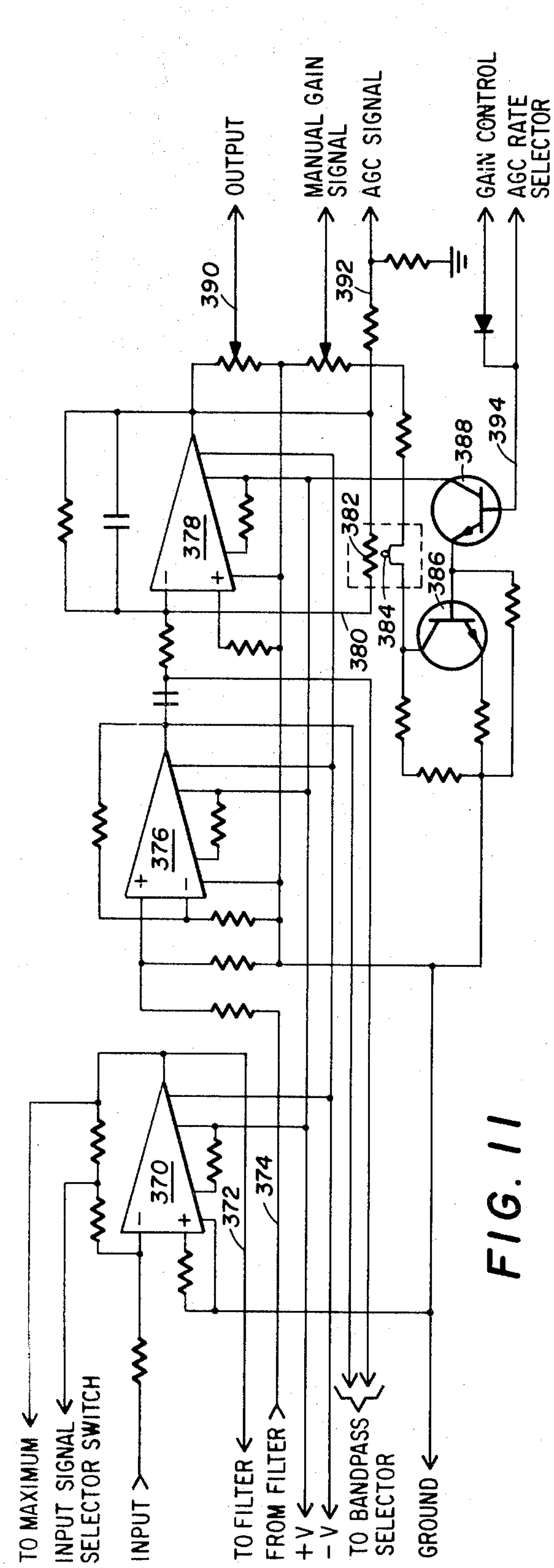
FIG. 11 is a schematic diagram of the seismic amplifier.

FIG. 11 illustrates the seismic amplifier wherein the input seismic signal is fed to the negative input of a preamplifier 370. The gain of the preamplifier 370 is selected by a signal switch located on the panel of the profiler according to the maximum input signal expected, i.e., 0.1 volt or 1.0 volt. The output of the preamplifier 370 is fed via lead 372 to the seismic filters 100. The output from the seismic filters 100 is fed via lead 374 to the input of a buffer amplifier 376 which provides the proper load impedance to the filters 100. The output of buffer amplifier 376 is fed to the negative input of an AGC amplifier 378.

The output from the buffer amplifier 376 is also fed via lead 380 to a light sensitive resistor 382. The resistance of resistor 382 is inversely proportional to the intensity of the light emitted from filament 384.

One terminal of the filament 384 is connected to the collector of a transistor 386, the base of which is connected to the emitter of a transistor 388. The collector of a transistor 388 is connected to the amplifier 378. The second terminal of the filament 384 is connected through adjustable resistances to an output via lead 390. The AGC signal is set from the resistor 382 via lead 392. Gain control and AGC rate selection controls are fed via lead 394 to the base of the transistor 388.

In the operation of the circuitry, the input signal may be operated upon in one of three modes—AGC, off, wideband or slow AGC, or medium AGC. The mode of operation is selectible by a manually operated selector switch. In the AGC off mode, the AGC amplifier 378 is bypassed so that the amplifier operates in a fixed gain manner. The gain level is manually adjustable by means of adjustment of a variable resistance.

When AGC is desired to be applied, the gain is varied inversely as the average level of the input signal. The average voltage from the filters 100 controls the gain of the amplifier system such that the output signal level does not exceed a preset value. The gain of the AGC amplifier 378 is controlled by resistance 382. Resistance 382 is inversely proportional to the intensity of the light striking it, with the intensity of the light being determined by the amount of current flowing through the filament 384.

The amount of current passing through filament 384 is determined by the output of the amplifier 378 through the action of the amplifier formed by transistors 386 and 388 responsive to the output level of amplifier 378. The signal applied via lead 394 controls the speed with which the feedback signal effects the amplifier gain. The wideband AGC allows the feedback circuitry to react faster to changes in gain level than does medium AGC. The medium AGC favors higher frequencies more than does the wideband AGC, dut to the faster reaction capability of the wideband AGC.

SEISMIC CHOPPER GATE AND DRIVER AMPLIFIER

Figure 12:
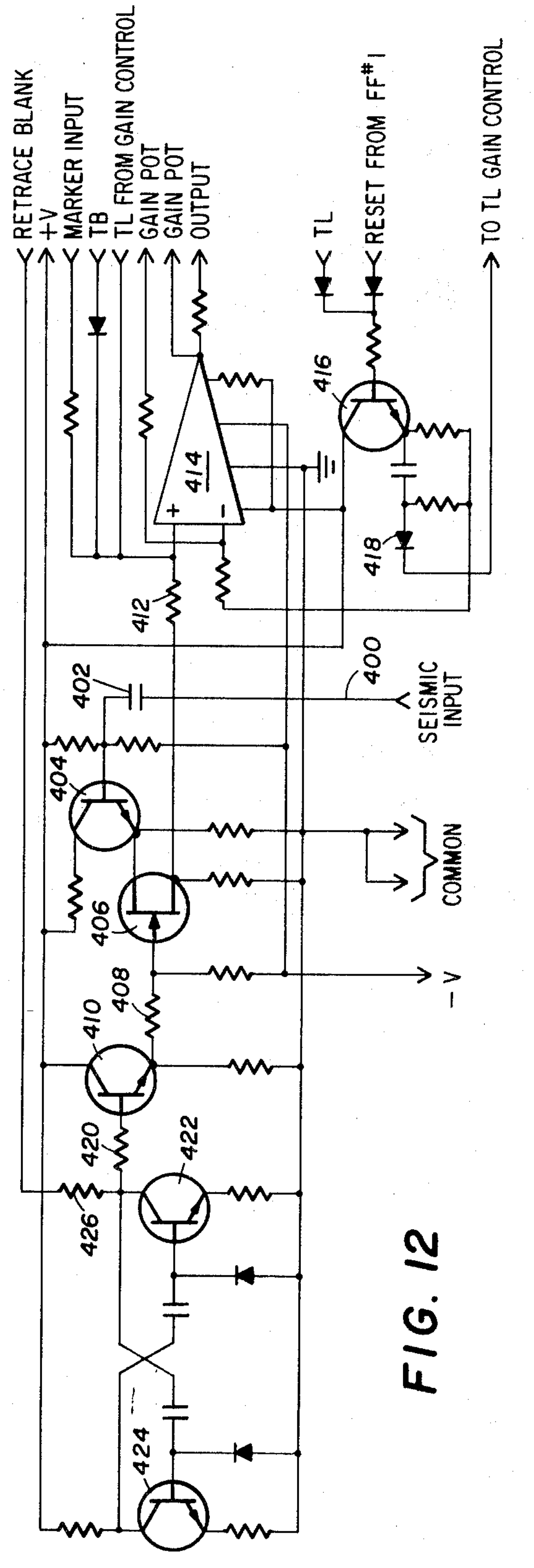
FIG. 12 is a schematic diagram of the seismic chopper gate and driver amplifier.

Referring to FIG. 12, the seismic input is fed via lead 400 through a capacitor 402 to the base of a transistor 404. The emitter of transistor 404 is connected to a field effect transistor 406 whose gate electrode is connected via resistance 408 to the emitter of a transistor 410. The drain of transistor 406 is connected via resistor 412 to the positive input of an amplifier 414. The negative input of the amplifier 414 is connected through suitable resistances to the emitter of a transistor 416. The base of the transistor 416 receives reset signals from the control flip-flop 52 and also receives a 10 pulse per second signal from the frequency divider.

The emitter of transistor 416 is fed via a resistance-capacitor network through diode 418 to gain control circuitry. The base of transistor 410 is connected through a resistor 420 to the collector of a transistor 422. Transistor 422 is connected to a transistor 424 in a multivibrator configuration. The collector of transistor 422 is connected via resistance 426 to receive a reset signal.

In operation of the circuitry of FIG. 12, the timebreak signal is fed into the input of the amplifier 414, with the amplified output of the amplifier 414 utilized to drive the write amplifier. The 10 pulse per second signal received by transistor 416 from the frequency divider is differentiated and rectified and then fed to the input of the amplifier 414 to provide timing lines on the chart paper 18. The seismic signal is input via lead 400 and is chopped into discrete pulses by a 1000 Hz. signal provided from the multivibrator comprising transistors 424 and 422. The multivibrator is free-running to provide a pulse train to the driver transistor 410.

The amplified pulse train is supplied as a chopping signal to the field effect transistor switch 406. The multivibrator operates only during the time that the control flip-flop 52 is in the set position, as the transistor 422 receives its power from the control flip-flop driver via resistance 426. During the time the control flip-flop 52 is in the reset position, the base of transistor 410 remains substantially at zero, and transistor 406 is gated off.

When the transistor 410 is turned on by the control flip-flop 52, the seismic signal then passes through lead 400 through transistor 404 which is biased to pass only the positive portion of the seismic signal. The seismic output from the emitter of transistor 404 is then chopped by the transistor 406 and is output through resistance 412 to the input of the driver amplifier 414.

The present profiler thus provides for the accurate recording of seismic data obtained in a moving marine seismic exploration system, and of data in other environments. The present profiler is not required to be in synchronism with a master clock system, but rather may be independently operated by the reception of a timebreak pulse or the like. The present profiler may be selectively swept in either direction by the operation of a switch, with the sweep time of the stylus easily varied.

While the present invention has been described with respect to specific embodiments thereof, it is to be understood that various changes and modifications may be suggested to one skilled in the art, and it is intended to encompass those changes and modifications as fall within the true scope of the invention.

What is claimed is:

1. A system for plotting representation of electrical signals on a record medium comprising:
- a recording stylus,
- means for reciprocating said stylus along a linear path,
- means for modulating the output of said recording stylus when moving in a first direction along said linear path to plot a series of linear segments and maintaining said recording stylus in a nonrecording state when moving in a second direction along said linear path,
- means for translating said record medium perpendicularly to said linear path for a preselected increment in synchronism with the reciprocation of said stylus, and
- means for selectively reversing said first and second directions.

2. The system of claim 1 and further comprising:
- means for periodically sampling portions of said electrical signals to provide signals for modulating the output of said recording stylus.

3. The system of claim 1 wherein said recording stylus plots a plurality of series of linear segments along a plurality of linear paths spaced apart by said preselected increment on said record medium, the linear segments of each linear path being representative of the amplitude of an electrical signal.

4. The system of claim 1 and further comprising:
- means for providing start signals at the initiation of each electrical signal,
- means for maintaining said recording stylus stationary at a reference point until the recection of a start signal, and
- means for returning said recording stylus along said linear path to said reference point after said recording stylus has plotted representations of the electrical signal across said record medium.

5. A recorder for plotting representations of a series of electrical seismic signals on a record medium comprising:
- means for periodically sampling portions of said seismic signals to provide output signals representative of the amplitude of said portions,
- a recording stylus responsive to said output signals for plotting graphic representations on said record medium, means for reciprocating said stylus along a linear path across said medium, means operable in synchronism with the reciprocation of said stylus for cyclically translating said record medium for a preselected increment in a direction perpendicular to said linear path, means for generating a start signal, circuitry responsive to said start signal for generating a ramp function, and wherein said means for reciprocating includes servomotor means responsive to said ramp function for translating said stylus along said linear path.

6. The recorder of claim 5 wherein said stylus plots a series of linear segments representative of said seismic signals while moving along said linear path in a first direction and said stylus is maintained in a nonrecording state when moving along said linear path in a second direction.

7. The recorder of claim 5 and further comprising:

means responsive to the position of said stylus for reversing the direction of translation of said stylus when said stylus reaches a preselected position along said linear path.

8. The recorder of claim 7 wherein said means responsive includes:

switch means adapted to be operated when said stylus completes a plotting traverse across said record medium, and means responsive to said switch means for terminating said ramp function.

9. The recorder of claim 8 wherein said record medium is translated from a position of rest for said preselected increment in response to the state of said switch means.

10. The recorder of claim 5 and further comprising:

means for varying the slope of said ramp function for controlling the rate of movement of said stylus.

11. The recorder of claim 5 wherein said recording stylus comprises:

an electrode emitting a modulated electrical signal for marking linear segments across a conductive record medium.

12. The recorder of claim 5 and further comprising:

means for periodically generating timing signals which modulate the output of said recording stylus to provide timing lines on said record medium.

13. The recorder of claim 5 wherein:

said stylus is slidable along a fixed linear track, said servo motor means is rotatable in dependence upon the reception of said seismic signals, and cable means connecting said servo motor means and said stylus for imparting motion to said stylus from said motor.

14. A recorder for plotting representations of a series of electrical seismic signals on a record medium comprising:

means for periodically sampling portions of said seismic signals to provide output signals representative of the amplitude of said portions, a recording stylus responsive to said output signals for plotting graphic representations on said record medium, means for reciprocating said stylus along a linear path across said medium, means operable in synchronism with the reciprocation of said stylus for cyclically translating said record medium for a preselected increment in a direction perpendicular to said linear path, wherein said means for reciprocating includes a fixed linear track, said stylus slidable along said fixed linear track, servo motor means rotatable in dependence upon the reception of said seismic signals, cable means connecting said motor means and said stylus for imparting motion to said stylus from said motor, and means for reversing the direction of rotation of said servo motor means in response to the position of said stylus.

15. The recorder of claim 14 wherein said means for reversing includes:

switch means operable to change the direction of rotation of said motor means, and a timing wheel rotated by said cable means for closing said switch means upon the completion of a traverse of said stylus across said record medium.

16. The recorder of claim 14 wherein said stylus is reciprocated in synchronism with the arrival of timebreak signals from a seismic exploration system.

References Cited

UNITED STATES PATENTS

| | | | |
|---|---|---|---|
| 2,892,666 | 6/1959 | Parker et al. | 346—17 |
| 3,195,103 | 7/1965 | Drenkelfort | 340—3 |
| 3,262,092 | 7/1966 | Richards | 340—3 |
| 3,293,596 | 12/1966 | Paterson | 340—15.5 |

JOSEPH W. HARTARY, Primary Examiner

U.S. Cl. X.R.

340—3, 15.5; 346—33